(12) United States Patent
Koikegami et al.

(10) Patent No.: US 11,870,375 B2
(45) Date of Patent: Jan. 9, 2024

(54) MOTOR APPARATUS AND VEHICLE

(71) Applicant: NIDEC ELESYS CORPORATION, Kanagawa (JP)

(72) Inventors: Takashi Koikegami, Kanagawa (JP); Satoshi Shimazu, Kanagawa (JP); Yuhi Nakada, Kanagawa (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 17/715,007

(22) Filed: Apr. 6, 2022

(65) Prior Publication Data
US 2022/0329185 A1 Oct. 13, 2022

(30) Foreign Application Priority Data
Apr. 7, 2021 (CN) .......................... 202110371715.8

(51) Int. Cl.
| | |
|---|---|
| *G05B 1/06* | (2006.01) |
| *H02P 21/18* | (2016.01) |
| *B60L 15/00* | (2006.01) |
| *B60L 15/20* | (2006.01) |
| *B60K 1/00* | (2006.01) |

(52) U.S. Cl.
CPC ............... *H02P 21/18* (2016.02); *B60K 1/00* (2013.01); *B60L 15/007* (2013.01); *B60L 15/20* (2013.01)

(58) Field of Classification Search
CPC . H02P 21/18; H02P 21/14; H02P 6/16; B60K 1/00; B60L 15/007; B60L 15/20
See application file for complete search history.

(56) References Cited

U.S. PATENT DOCUMENTS

| | | | |
|---|---|---|---|
| 2014/0225551 A1* | 8/2014 | Omata | ................... H02P 21/22 |
| | | | 318/504 |
| 2022/0169231 A1* | 6/2022 | Han | ......................... B60K 6/20 |

FOREIGN PATENT DOCUMENTS

| | | | | |
|---|---|---|---|---|
| DE | 102018117891 A1 * | 1/2019 | ............ | B60L 15/025 |
| EP | 2985904 A1 * | 2/2016 | ............ | B60L 15/025 |
| JP | 4475642 | 6/2010 | | |
| JP | 2020114057 | 7/2020 | | |

\* cited by examiner

*Primary Examiner* — Karen Masih
(74) *Attorney, Agent, or Firm* — JCIPRNET

(57) ABSTRACT

A motor apparatus is provided. The motor apparatus includes a motor having a rotor and a stator, an inverter used to covert an input voltage into a three-phase alternating current (AC) voltage and provide the three-phase AC voltage to the motor, an inverter controller used to control the inverter, and a rotation angle sensor. The rotation angle sensor is fixed to the motor and is used to detect a rotation angle of the motor. The inverter controller includes a calculator. The calculator calculates an offset angle of an installation position of the rotation angle sensor according to a difference between a measured value and a theoretical value of a voltage phase of the motor.

8 Claims, 5 Drawing Sheets

MOTOR APPARATUS AND VEHICLE

CROSS REFERENCE TO RELATED APPLICATIONS

The present invention claims priority under 35 U.S.C. § 119 to Chinese Application No. 202110371715.8 filed on Apr. 7, 2021, the entire content of which is incorporated herein by reference.

FIELD OF THE INVENTION

The disclosure relates to a motor apparatus, and in particularly, relates to a motor apparatus including a rotation angle sensor that detects a rotation angle of a motor.

BACKGROUND

Conventionally, in order to detect the rotation angle of an in-vehicle motor or the like, a resolver is generally used. However, an abnormality of the resolver may occur due to external factors such as jerky driving of the vehicle in which the in-vehicle motor is mounted. When an abnormality occurs in the resolver, the rotation angle is unable to be accurately detected, so that the motor control is unable to be performed accurately.

In a a method for diagnosing abnormality of a resolver the difference between the sum of a plurality of sampling values outputted from the resolver in one cycle and the zero value is set as the offset value, and when the offset value exceeds the threshold, it is determined that the resolver is abnormal.

Further, the first electrical angle and the second electrical angle are individually calculated according to the signal outputted from the resolver, and when the first electrical angle and the second electrical angle do not match, it is determined that the resolver is abnormal.

However, in the related art, only abnormality such as output offset of the resolver is able to be detected, but the physical offset (angular offset) of the resolver is unable to be detected.

SUMMARY

In the first aspect of the disclosure, the disclosure provides a motor apparatus including a motor, an inverter, an inverter controller, and a rotation angle sensor. The motor includes a rotor and a stator. The inverter is used to covert an input voltage into a three-phase alternating current (AC) voltage and provide the three-phase AC voltage to the motor. The inverter controller is used to control the inverter. The rotation angle sensor is fixed to the motor and is used to detect a rotation angle of the motor. The inverter controller includes a calculator, and the calculator calculates an offset angle of an installation position of the rotation angle sensor according to a difference between a measured value and a theoretical value of a voltage phase of the motor.

According to the motor apparatus of the disclosure, the physical offset of the rotation angle sensor may be easily detected by software without requiring an additional external apparatus.

The second aspect of the motor apparatus provided by the disclosure is included in the first aspect. Preferably, the inverter controller further includes a determination component, and the determination component determines whether or not the calculator is allowed to perform the calculation. When the determination component allows the calculator to perform the calculation, the calculator calculates the offset angle of the installation position of the rotation angle sensor.

According to the motor apparatus provided by the disclosure, the calculator of the inverter controller is able to perform the calculation only when the offset angle of the installation position of the rotation angle sensor is required to be calculated. Therefore, the operation of the calculator may be efficiently performed, and the offset angle of the installation position of the rotation angle sensor may be avoided from being calculated when it is not necessary.

The third aspect of the motor apparatus provided by the disclosure is included in the second aspect. Preferably, the determination component determines whether or not the calculator is allowed to perform the calculation based on a current flowing in the motor, a system state, and a speed of the motor.

According to the motor apparatus provided by the disclosure, the calculator is allowed to calculate the offset angle of the installation position of the rotation angle sensor only when all three conditions of the current flowing in the motor, the system state, and the speed of the motor are satisfied. Therefore, the operation of the calculator may be efficiently performed, and the offset angle of the installation position of the rotation angle sensor may be avoided from being calculated when it is not necessary.

The fourth aspect of the motor apparatus provided by the disclosure is included in the first aspect. Preferably, the motor apparatus is s mounted on a vehicle, and the vehicle includes a vehicle controller. The inverter controller further includes a diagnosis component and a controller, and the diagnosis component notifies the controller and the vehicle controller of an abnormality when the offset angle exceeds a predetermined value.

According to the motor apparatus provided by the disclosure, since the abnormality is notified to the controller of the inverter controller and the vehicle controller when the offset angle of the installation position of the rotation angle sensor exceeds the predetermined value, the relevant controller is notified to take measures to prevent poor control of the motor apparatus due to the offset of the rotation angle sensor.

The fifth aspect of the motor apparatus provided by the disclosure is included in the fourth aspect. Preferably, the inverter has gate driver and a motor driver circuit including an upper arm and a lower arm. The controller performs on-off control of switches included in the upper arm and the lower arm by outputting a signal to the gate driver. The diagnosis component notifies the controller of an abnormality when a speed of the motor exceeds a threshold, and the controller then executes fail-safe control.

The sixth aspect of the motor apparatus provided by the disclosure is included in the fifth aspect. Preferably, the fail-safe control is active short circuit (ASC) control for turning on one of the upper arm and the lower arm in all phases and turning off the other one in all phases.

The seventh aspect of the motor apparatus provided by the disclosure is included in the fifth aspect. Preferably, the fail-safe control is shut down (SD) control for turning off both the upper arm and the lower arm in all phases.

When the motor rotates at a high speed, the switches heat up, and if the rotation angle sensor is offset and the motor is unable be accurately controlled, the motor may further accelerate. According to the motor apparatus provided by the disclosure, when the rotation angle sensor is offset and the motor rotates at a high speed, the fail-safe control (ASC control or SD control) may be performed, so that the failure of the switches and the batteries may be prevented from occurring.

A vehicle provided in the eighth aspect of the disclosure includes the motor apparatus according to aspect 1.

The above and other elements, features, steps, characteristics and advantages of the present disclosure will become more apparent from the following detailed description of the preferred embodiments with reference to the attached drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
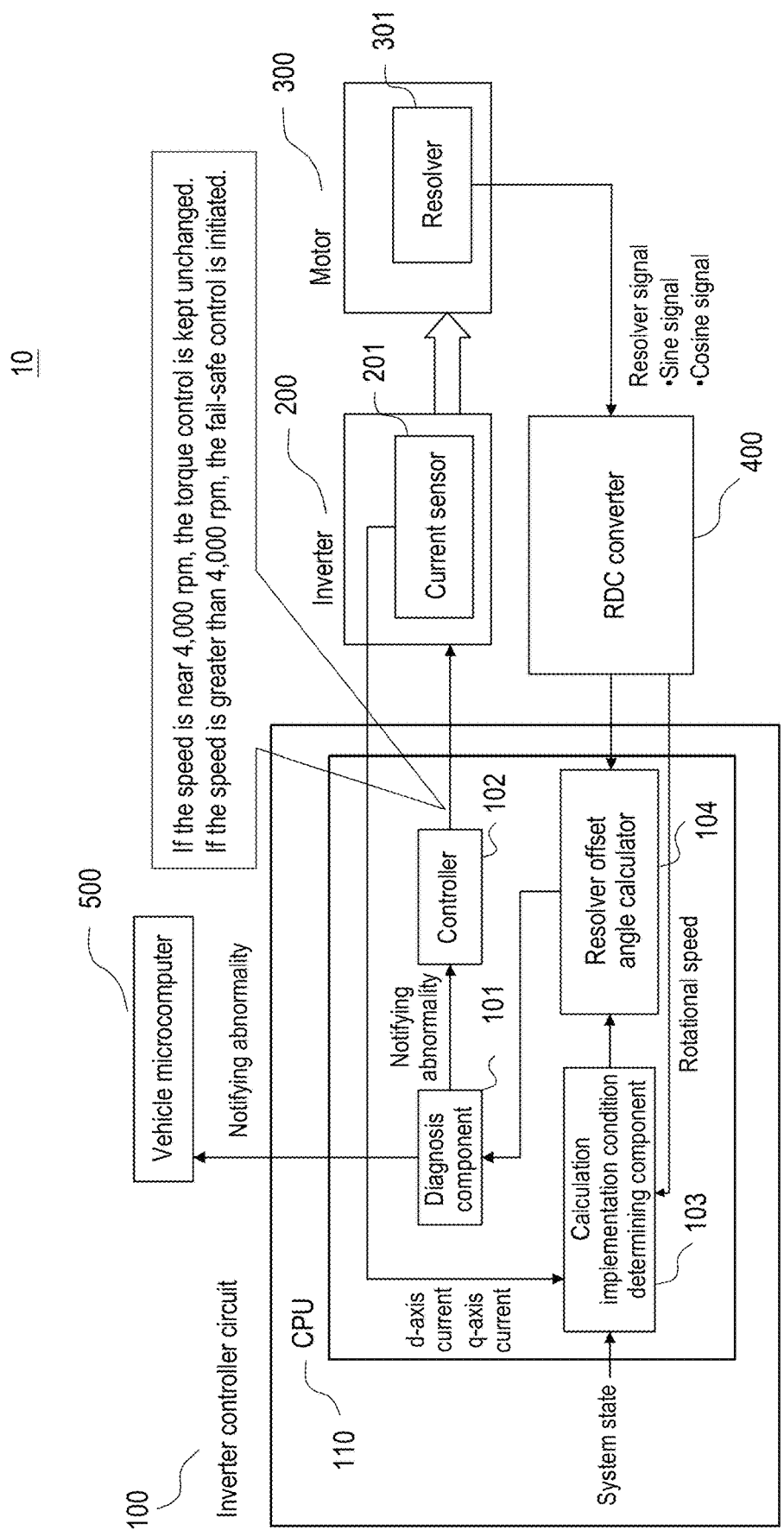
FIG. 1 is a schematic diagram illustrating a structure of a motor apparatus according the disclosure.

Hereinafter, preferred exemplary embodiments of a motor apparatus according to the disclosure are described with reference to the drawings. In the drawings, the same or corresponding parts are denoted by the same reference numerals.

FIG. 1 is a schematic diagram illustrating a structure of a motor apparatus according the disclosure. As an example, a motor apparatus 10 provided by the disclosure includes a motor 300, an inverter 200, an inverter controller (central processing unit (CPU)) 110, a rotation angle sensor 301.

The motor 300 has a rotor and a stator, and is a motor that is rotationally driven by being supplied of a three-phase alternating current (AC) voltage. For instance, the motor 300 may employ a permanent magnet synchronous motor.

The rotation angle sensor 301 is fixed to the motor 300 and is used to detect a rotation angle of the motor 300. Herein, the rotation angle sensor 301 is, for example, a resolver.

Figure 5B:
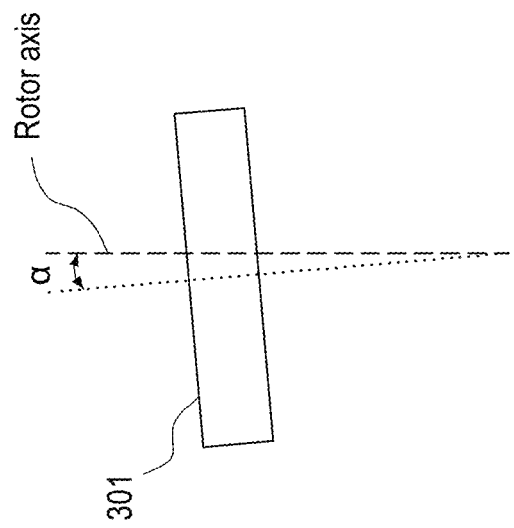
FIG. 5A and FIG. 5B are a schematic diagrams illustrating a physical angular offset of a resolver with respect to a rotor axis.
Figure 5A:
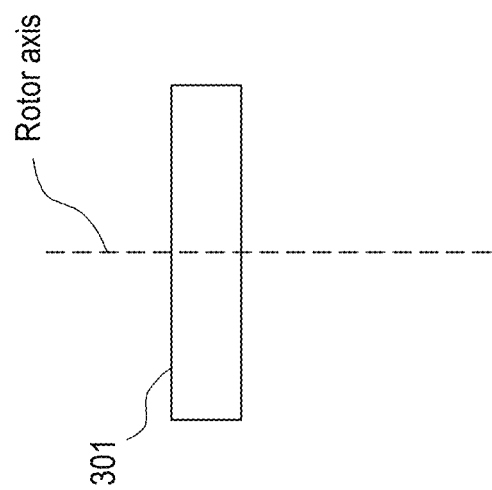

FIG. 5A and FIG. 5B are schematic diagrams illustrating a physical angular offset of a resolver with respect to a rotor axis. In FIG. 5A, a normal situation in which a resolver 301 is not angularly offset with respect to a rotor axis of the motor 300 is shown. In FIG. 5B, an abnormal situation in which the resolver 301 is offset by an angle a counterclockwise with respect to the rotor axis of the motor 300.

The resolver 301 transmits a detected resolver signal including a sine signal and a cosine signal to a resolver-to-digital converter (RDC) converter 400. The RDC converter 400 converts the resolver signal into a digital signal and sends the digital signal to the resolver offset angle calculator104. The RDC converter 400 also transmits a speed of the motor obtained according to the resolver signal to a calculation implementation condition determining component 103.

The inverter 200 converts direct current (DC) power stored in a battery (not shown in FIG. 1) into a three-phase AC power with a variable voltage and a variable frequency and provides the converted three-phase AC power to the motor 300. The inverter 200 includes a current sensor 201, and the current sensor 201 detects the three-phase current in the inverter 200 and supplies the detected three-phase current to the inverter controller 110.

The inverter controller 110 is disposed in an inverter controller circuit 100 and is used to control the inverter 200. The inverter controller 110 includes a diagnosis component 101, a controller 102, the calculation implementation condition determining component 103 (equivalent to a determination component), and a resolver offset angle calculator 104 (equivalent to a calculator).

The calculation implementation condition determining component 103 determines whether or not the resolver offset angle calculator 104 is allowed to perform calculation based on a current flowing in the motor 300, a system state, and the speed of the motor 300. The resolver offset angle calculator 104 calculates an offset angle of an installation position of the rotation angle sensor 301 according to a difference between a measured value and a theoretical value of a voltage phase of the motor 300 and provides the calculated offset angle to the diagnosis component 101. Specific operations of the calculation implementation condition determining component 103 and the resolver offset angle calculator 104 are to be described in detail in the following paragraphs.

The diagnosis component 101 notifies the controller 102 and a vehicle microcomputer 500 (equivalent to a vehicle controller) of an abnormality when the offset angle exceeds a predetermined value. Since the abnormality is notified to the controller 102 of the inverter controller 110 and the vehicle controller 500 when the offset angle of the installation position of the rotation angle sensor 301 exceeds the predetermined value, the relevant controller is notified to take measures to prevent poor control of the motor apparatus due to the offset of the rotation angle sensor 301.

The controller 102 determines whether or not the speed of the motor 300 exceeds, for example, 4,000 rpm when receiving the abnormality notification from the diagnosis component 101. When the rotational of the motor 300 does not exceed 4,000 rpm, torque control is kept unchanged. When the speed of the motor 300 exceeds 4,000 rpm, fail-safe control is initiated. The specific operation of the fail-safe control is to be described in detail in the following paragraphs.

Figure 2:
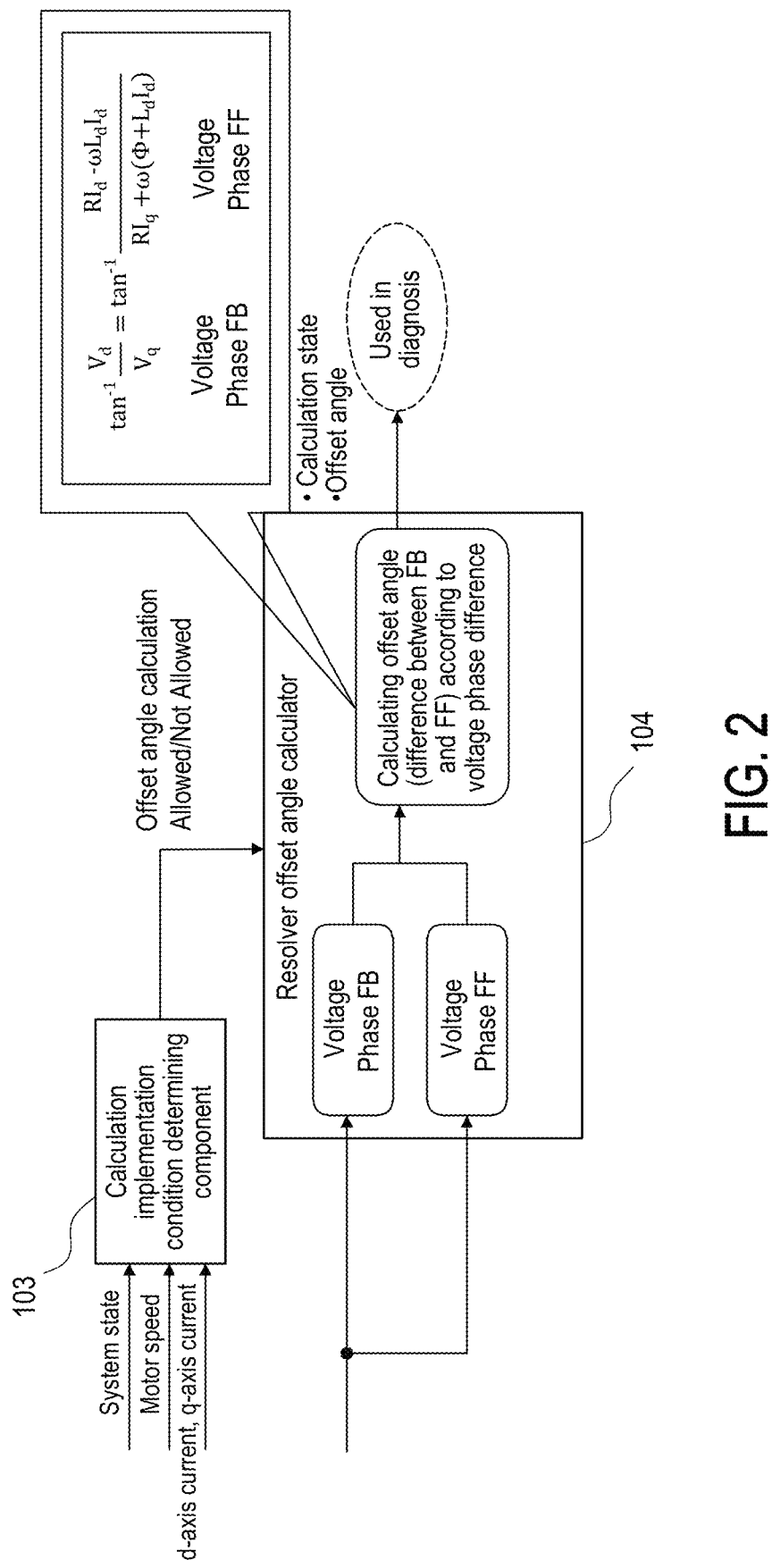
FIG. 2 is a schematic diagram illustrating a detailed structure of a calculation implementation condition determining component and a resolver offset angle calculator in the motor device.

FIG. 2 is a schematic diagram illustrating a detailed structure of a calculation implementation condition determining component and a resolver offset angle calculator in the motor device.

The calculation implementation condition determining component 103 determines whether or not the resolver offset angle calculator 104 is allowed to perform calculation based on the current flowing in the motor 300, the system state, and the speed of the motor 300.

To be specific, the CPU 110 converts the three-phase current detected by the current sensor 201 into a d-axis current $I_d$ and a q-axis current $I_q$, and the d-axis current $I_d$ and the q-axis current $I_q$ are supplied to the calculation implementation condition determining component 103. The d-axis current $I_d$ and the q-axis current $I_q$ are used to calculate a voltage vector $V_{dq}$, and the voltage vector $V_{dq}$ is a result of vector synthesis of a d-axis component and a q-axis component. When either the d-axis component or the q-axis component is excessively large, the voltage phase is unable to be detected. Therefore, as one of the calculation implementation conditions, it is necessary to satisfy the condition that one of $I_d$ and $I_q$ is not excessively large (hereinafter, simply referred to as an $I_d$·$I_q$ condition).

Besides, the CPU 110 determines a state from the vehicle microcomputer (VCU) 500, and a determination result is provided to the calculation implementation condition determining component 103. In general, it is desirable to detect whether the resolver is offset only when the vehicle starts running. Therefore, as another calculation implementation condition, it is necessary to satisfy the condition that the vehicle has started to run (hereinafter, simply referred to as a system state condition).

In addition, when the speed of the motor is near 0 rpm, the voltage phase is unable to be detected. Therefore, as another calculation implementation condition, it is necessary to satisfy the condition that the speed of the motor is not near 0 rpm (hereinafter, simply referred to as a speed condition).

That is, the calculation implementation condition determining component 103 allows the resolver offset angle calculator 104 to perform the calculation only when the abovementioned "$I_d$·$I_q$ condition", "system state condition", and "speed condition" are all satisfied. As such, the operation of the calculation implementation condition determining component may be efficiently performed, and the offset angle of the installation position of the resolver may be avoided from being calculated when it is not necessary.

When the calculation implementation condition determining component 103 allows the resolver offset angle calculator 104 to perform the calculation, the resolver offset angle calculator 104 calculates the offset angle of the installation position of the rotation angle sensor 301 according to the difference between the measured value and the theoretical value of the voltage phase of the motor 300.

To be specific, the resolver offset angle calculator 104 calculates a voltage phase FF as the theoretical value by the following formula 1 according to the d-axis current $I_d$, the q-axis current $I_q$, a winding resistance value R of the motor, an angular velocity of the motor (angular velocity of an electrical angle) ω, flux linkage flux Φ, d-axis inductance Ld, and q-axis inductance Lq.

$$\text{Voltage Phase } FF = \tan^{-1} \frac{RI_d - \omega L_q I_q}{RI_q + \omega(\Phi + L_d I_d)} \quad \text{(formula 1)}$$

Further, the resolver offset angle calculator 104 calculates a voltage phase FB as the measured value by the following formula 2 according to a detected d-axis voltage Vd and q-axis voltage Vq.

$$\text{Voltage Phase } FB = \tan^{-1} \frac{V_d}{V_q} \quad \text{(formula 2)}$$

Next, the resolver offset angle calculator 104 calculates the difference between the voltage phase FB and the voltage phase FF as the offset angle of the installation position of the rotation angle sensor 301.

The resolver offset angle calculator 104 provides the calculated offset angle to the diagnosis component 101. The diagnosis component 101 notifies the controller 102 and the vehicle microcomputer 500 (equivalent to the vehicle controller) of an abnormality when the offset angle exceeds a predetermined threshold (e.g., 30°).

Therefore, according to the motor apparatus of the disclosure, the physical offset of the rotation angle sensor may be easily detected by software without requiring an additional external apparatus.

Figure 3:
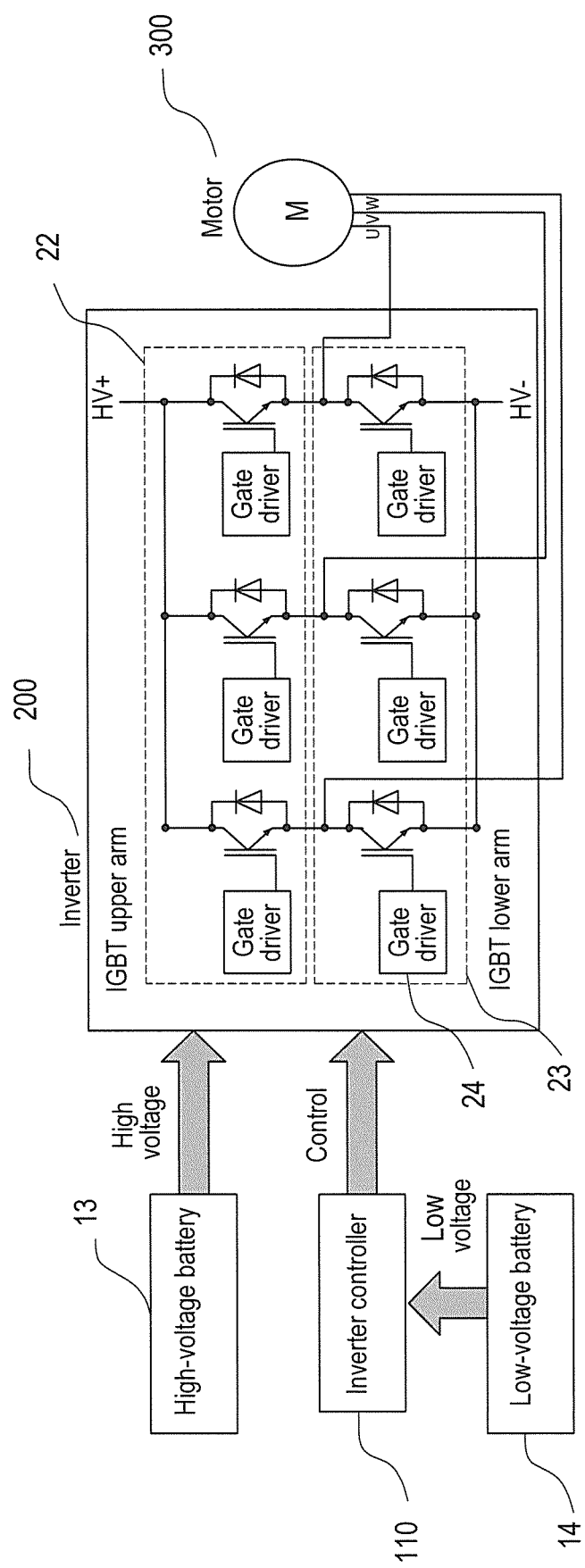
FIG. 3 is a schematic diagram illustrating a partial structure of the motor apparatus in fail-safe control according to the disclosure.
Figure 4:
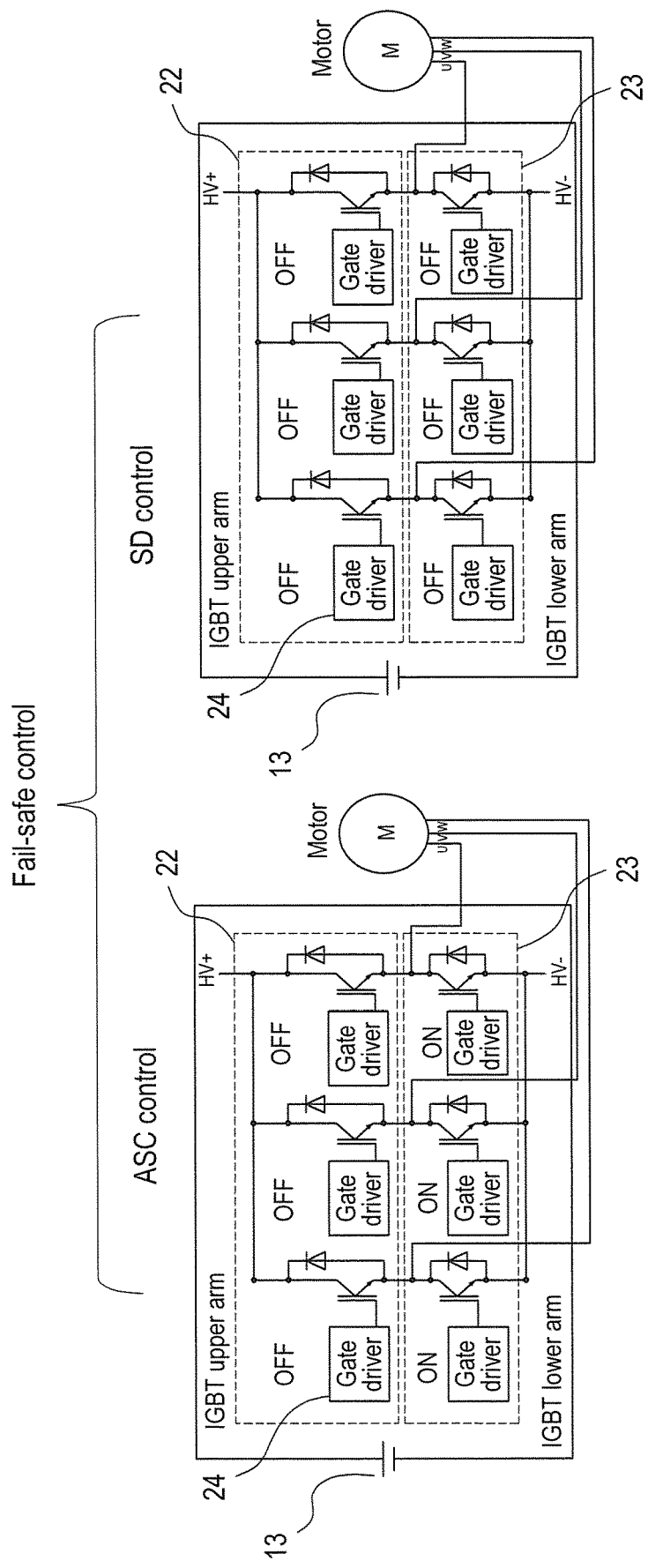
FIG. 4 is a schematic diagram illustrating active short circuit (ASC) control and shut down (SD) control in the fail-safe control according to the disclosure.

FIG. 3 is a schematic diagram illustrating a partial structure of the motor apparatus in fail-safe control according to the disclosure. FIG. 4 is a schematic diagram illustrating active short circuit (ASC) control and shut down (SD) control in the fail-safe control according to the disclosure.

As shown in FIG. 3, the inverter 200 has a gate driver 24 and a motor driver circuit including an upper arm 22 and a lower arm 23. A high-voltage battery 13 provides a high voltage to the inverter 200, and a low-voltage battery 14 provides a low voltage to the inverter controller 110. Herein, insulated gate bipolar transistors (IGBTs) are adopted as switches in the upper arm and the lower arm, but the disclosure is not limited thereto.

The controller 102 in the inverter controller 110 performs on-off control of the switches included in the upper arm 22 and the lower arm 23 by outputting a control signal to the gate driver 24. When the speed of the motor 300 does not exceed the threshold, the controller 102 performs normal torque control. That is, the on-off of the six switches of the upper arm 22 and the lower arm 23 is controlled via the gate driver 24 in the inverter 200, so that the inverter 200 converts the DC power stored in the high-voltage battery into the three-phase AC power with the variable voltage and the variable frequency and provides the converted three-phase AC power to the motor 300.

When the speed of the motor 300 exceeds the threshold, the diagnosis component 101 notifies the controller 102 of the abnormality, and the controller 102 thereby ends the normal torque control and starts to execute the fail-safe control.

As shown in the left part of FIG. 4, the fail-safe control described above may be ASC control in which one of the upper arm 22 and the lower arm 23 is turned on in all phases and the other is turned off in all phases. By adopting the ASC control, a counter-electromotive force generated in the motor is able to be recirculated, so the batteries are prevented from being overcharged, and failure of the switches and the batteries may be prevented.

In addition, as shown in the right part of FIG. 4, the abovementioned fail-safe control may be SD control in which both the upper arm 22 and the lower arm 23 are turned off in all phases. By adopting the SD control, failure of the switches and the batteries may be prevented.

When the motor rotates at a high speed, the switches heat up, and if the rotation angle sensor is offset and the motor is unable be accurately controlled, the motor may further accelerate. Therefore, according to the motor apparatus provided by the disclosure, when the rotation angle sensor is offset and the motor rotates at a high speed, the fail-safe control (ASC control or SD control) may be performed, so that the failure of the switches and the batteries may be prevented from occurring.

Further, a vehicle provided by the disclosure includes the abovementioned motor apparatus.

It should be understood that, within the scope of the disclosure, the components in the exemplary embodiments may be freely combined, or the components in the exemplary embodiments may be appropriately modified or omitted.

As described above, although the disclosure is demonstrated in detail, the description is only an example in all respects, and the disclosure is not limited thereto. Numerous variations which are not shown may be construed as conceivable without departing from the scope of the disclosure.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor apparatus, comprising:
   a motor;
   an inverter, used to convert an input voltage into a three-phase alternating current voltage and provide the three-phase alternating current voltage to the motor;
   an inverter controller, used to control the inverter; and
   a rotation angle sensor, fixed to the motor, used to detect a rotation angle of the motor,
   wherein the inverter controller comprises a calculator, and the calculator calculates an offset angle of an installation position of the rotation angle sensor according to a difference between a measured value and a theoretical value of a voltage phase of the motor.

2. The motor apparatus according to claim 1, wherein the inverter controller further comprises a determination component, and the determination component determines whether or not the calculator is allowed to perform the calculation, the calculator calculates the offset angle of the installation position of the rotation angle sensor when the determination component allows the calculator to perform the calculation.

3. The motor apparatus according to claim 2, wherein the determination component determines whether or not the calculator is allowed to perform the calculation based on a current flowing in the motor, a system state, and a speed of the motor.

4. The motor apparatus according to claim 1, wherein the motor apparatus is s mounted on a vehicle, and the vehicle includes a vehicle controller,
   the inverter controller further comprises a diagnosis component and a controller, and
   the diagnosis component notifies the controller and the vehicle controller of an abnormality when the offset angle exceeds a predetermined value.

5. The motor apparatus according to claim 4, wherein the inverter has a motor driver circuit comprising an upper arm and a lower arm,
   the controller perfoinis on-off control of switches comprised in the upper aim and the lower arm, and
   the diagnosis component notifies the controller of an abnormality when a speed of the motor exceeds a threshold, and the controller then executes fail-safe control.

6. The motor apparatus according to claim 5, wherein the fail-safe control is control for turning on one of the upper arm and the lower arm in all phases and turning off the other one in all phases.

7. The motor apparatus according to claim 5, wherein the fail-safe control is control for turning off both the upper arm and the lower arm in all phases.

8. A vehicle, comprising the motor apparatus according to claim 1.

* * * * *